United States Patent [19]

Nogami

[11] 4,140,351
[45] Feb. 20, 1979

[54] BRAKE BOOSTER FOR VEHICLES
[75] Inventor: Takahiro Nogami, Mishima, Japan
[73] Assignee: Toyota Jidosha Kogyo Kabushiki Kaisha, Aichi, Japan
[21] Appl. No.: 833,078
[22] Filed: Sep. 14, 1977
[51] Int. Cl.² .......................... B60T 8/18; B60T 13/20
[52] U.S. Cl. .................................... 303/23 R; 60/545; 60/558; 60/593
[58] Field of Search ................ 60/545, 547, 549, 551, 60/555, 557, 558, 559, 560, 567, 574, 581, 591, 593; 303/23 R, 23 A, 114

[56] References Cited

U.S. PATENT DOCUMENTS

| | | | |
|---|---|---|---|
| 2,977,934 | 4/1961 | Pulkownik | 60/558 |
| 2,997,850 | 8/1961 | Hupp | 60/558 |
| 3,406,521 | 10/1968 | Casellas | 60/558 |
| 3,612,621 | 10/1971 | Scott | 303/23 R |
| 3,637,054 | 1/1972 | Billeter | 303/23 R |
| 3,756,660 | 9/1973 | Burgdorf | 60/555 |

*Primary Examiner*—Martin P. Schwadron
*Assistant Examiner*—Abraham Hershkovitz
*Attorney, Agent, or Firm*—Oblon, Fisher, Spivak, McClelland & Maier

[57] ABSTRACT

A brake booster for a vehicle comprises first and second control pistons operated by hydraulic pressure from a master cylinder, and a power piston pneumatically actuated in response to movement of the control pistons to increase braking pressure applied to the wheel brake cylinders of the vehicle. To control the increasing ratio of the braking pressure in accordance with the changes of the vehicle weight, under unloaded condition of the vehicle only the first control piston is operated by the master cylinder pressure to actuate the power piston and under loaded condition of the vehicle the second control piston co-operates with the first control piston by the master cylinder pressure to accelerate the actuation of the power piston.

4 Claims, 3 Drawing Figures

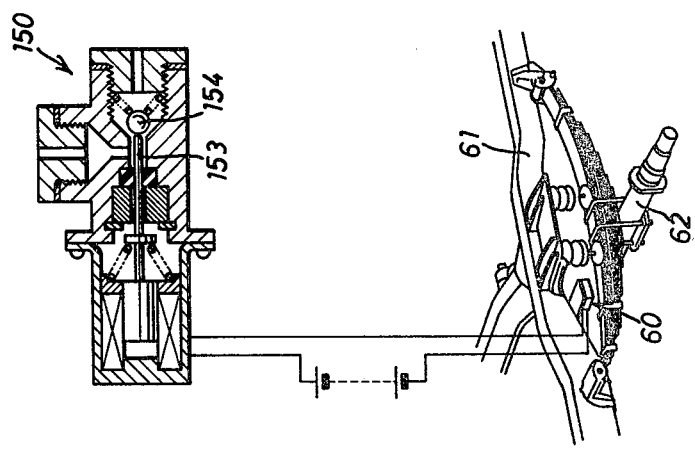
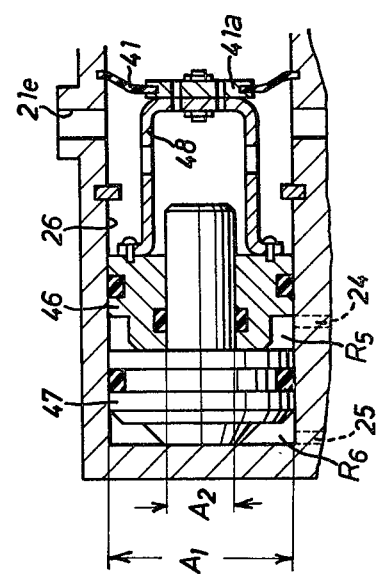

BRAKE BOOSTER FOR VEHICLES

BACKGROUND OF THE INVENTION

The present invention relates to a power brake device for a vehicle, and more particularly to a brake booster which is pneumatically actuated in response to hydraulic pressure applied thereto from a master cylinder in braking of the vehicle.

In conventional brake boosters of this type, a power piston is pneumatically actuated in response to movement of a control piston operated by hydraulic pressure from a master cylinder to increase braking pressure applied to the wheel brake cylinders. This means that the increasing ratio of the braking pressure is controlled by the function of the control piston in a predetermined value. If the function of the control piston is set to control the increasing ratio of the braking pressure in a predetermined high value in consideration of a loaded condition of the vehicle, it will be experienced that when the vehicle is unloaded, an excessive braking pressure causes sudden brake of the vehicle in the normal braking operation.

SUMMARY OF THE INVENTION

Accordingly, it is a primary object of the present invention to provide an improved brake booster wherein the control piston serves to control the increasing ratio of the braking pressure in accordance with the changes of the vehicle weight.

Another object of the present invention is to provide an improved brake booster wherein the function of the control piston is manually adjusted in accordance with variation of the vehicle load.

A further object of the present invention is to provide an improved brake booster wherein the function of the control piston is automatically adjusted in accordance with variation of the vehicle load.

BRIEF DESCRIPTION OF THE DRAWINGS

Additional objects and advantages of the present invention will be more readily apparent from the following detailed description of preferred embodiments thereof when taken together with the accompanying drawings in which:

FIG. 2 is an enlarged view showing assembling construction of the first and second control pistons of FIG. 1; and FIG. 3 illustrates a modification of the cut-off valve unit shown in FIG. 1.

DESCRIPTION OF THE PREFERRED EMBODIMENTS

Figure 1:
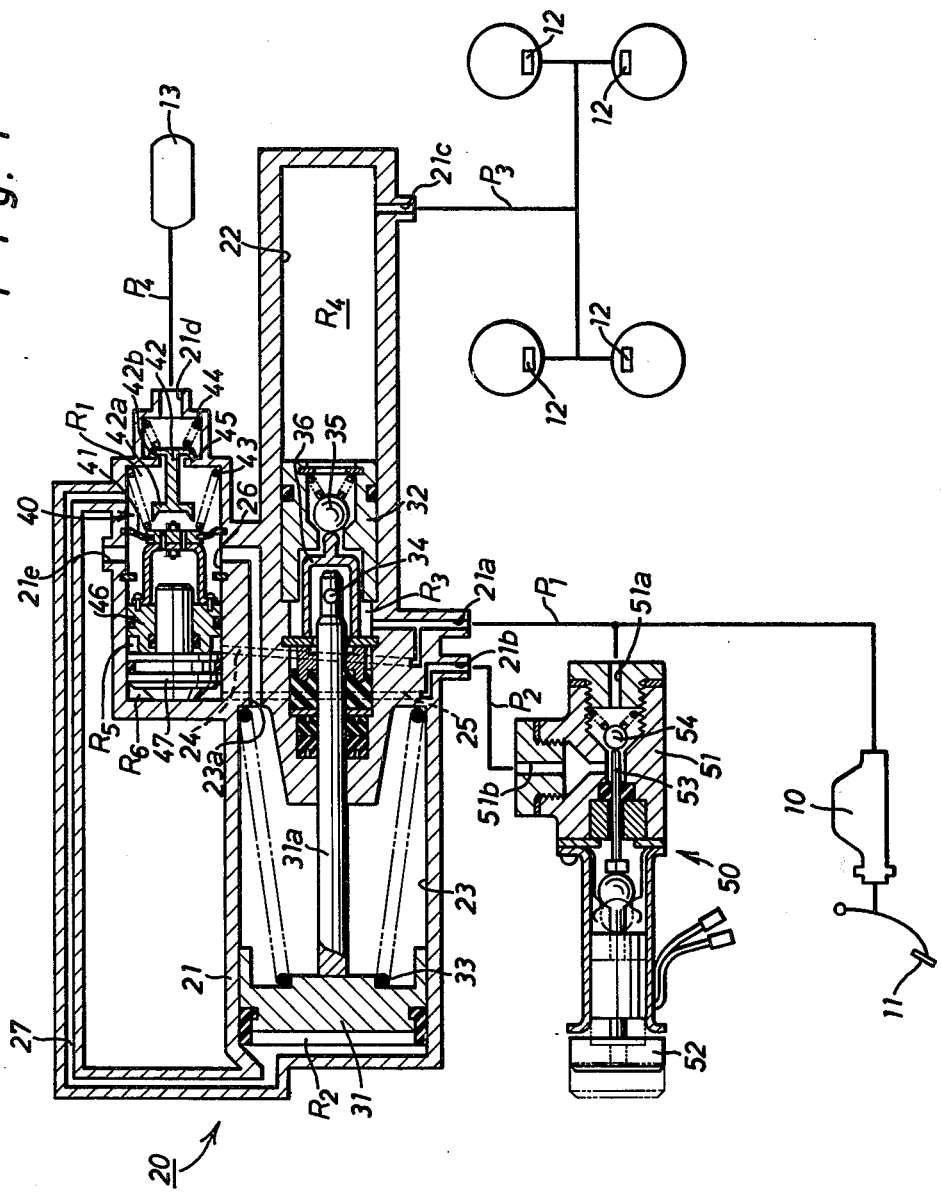
FIG. 1 is a cross-sectional view of a preferred embodiment of the present invention adapted to a servomechanism for an automotive vehicle.

Referring now to the accompanying drawings, particularly to FIG. 1, there is disclosed a preferred embodiment of the present invention adapted to a hydraulic air servomechanism or brake booster 20 for an automotive vehicle. The servomechanism 20 is disposed between a pipe-line $P_1$ in connection to a master cylinder 10 and a pipe-line $P_3$ in connection to wheel brake cylinders 12. The master cylinder 10 is operated by depression of a foot brake pedal 11.

The servomechanism 20 comprises a housing 21 in which a power piston 31, an operating piston 32, a control valve 40 and control pistons 46 and 47 are assembled. The housing 21 is provided thereon with first and second inlet ports 21a and 21b. The first inlet port 21a is in communication with the master cylinder 10 and a port 51a of a cut-off valve unit 50 through the pipe-line $P_1$. The second inlet port 21b is in communication with a port 51b of the cut-off valve unit 50 through a pipe-line $P_2$. The housing 21 is also provided thereon with an outlet port 21c in communication with the wheel brake cylinders 12 through the pipe-line $P_3$. An air inlet port 21d of the housing 21 is communicated through a pipe-line $P_4$ with an air tank 13 which is connected to a source of compressed air (not shown). An air outlet port 21e of the housing 21 is communicated directly with the atmospheric air. The housing 21 has a first stepped bore 22, a main bore 23 coaxial with the first stepped bore 22 and a second stepped bore 26 in parallel with the first stepped bore 22. The first stepped bore 22 is isolated from the main bore 23 and the second stepped bore 26 is communicated with the main bore 23 through a passage 23a.

The power piston 31 is slidably disposed through an annular sea member within the main bore 23 to form a power chamber $R_2$ in communication with a control chamber $R_1$ in the second stepped bore 26 by way of a passage 27. The power piston 31 urged toward the lower chamber $R_2$ by biasing force of a compression spring 33 whch is interposed between a right end of the power piston 31 and an end wall of the main bore 23. A push rod 31a extended from the power piston 31 is inserted into the first stepped bore 22 through annular seal members.

The operating piston 32 is slidably disposed through an annular seal member within the first stepped bore 22 to form a pressure chamber $R_3$ in communication with the first inlet port 21a and a pressure chamber $R_4$ in communication with the outlet port 21c. The operating piston 32 is connected to the push rod 31a of the power piston 31 by means of a lateral pin 34 and is provided therein with a float member 36 slidable on the axial direction and a check value 35. Under inoperative condition of the servomechanism 20, the check value 35 is opened by the float member 28 to permit fluid communication between the pressure chamber $R_3$ and $R_4$, as shown in FIG. 1.

The control valve 40 is assembled within the second stepped bore 26 and comprises a diaphragm 41 and a valve body 42. The diaphragm 41 is hermetically secured at the outer periphery thereof to the inner wall of the second stepped bore 26 and integrally provided at the central portion thereof with a valve seat 41a having a plurality of holes, as clearly shown in FIG. 2. The valve seat 41a of the diaphragm 41 is ordinarily separated from the valve body 42 due to biasing force of a compression spring 43 interposed between the valve seat 41a and a portion of the stepped bore 26. The valve body 42 has a first annular valve part 42a cooperating with the valve seat 41a and a second annular valve part 42b cooperating with an annular valve seat 45. The second valve part 42b the valve body 42 is ordinarily engaged with the valve seat 45 by biasing force of a compression spring 44 which is interposed between the second valve part 42b and a portion of the stepped bore 26. Thus, in the control valve 40, the control chamber $R_1$ is ordinarily in communication with the atmospheric air through the holes of the valve seat 41a and the air outlet port 21e. Under operative condition of the servomechanism 20, the control chamber $R_1$ is isolated from the atmospheric air by engagement of the valve seat 41a with the first valve part 42a and is subsequently communicated with the air tank 13 through the air inlet port 21d and the pipe-line P₄ due to disengagement of the second valve part 42b from the valve seat 45.

The first control piston 46 is a stepped piston which is slidably disposed within the second stepped bore 26 through an annular seal member. The first stepped piston 46 is fixedly connected with the valve seat 41a of the diaphragm 41 by a U-shaped member 48, as clearly shown in FIG. 2. The second control piston 47 is a stepped piston, of which small diameter portion is slidably disposed within the first stepped piston 46 through an annular seal member. A large diameter portion of the second stepped piston 47 is slidably disposed within the stepped bore 26 through an annular seal member to form an annular pressure chamber $R_5$ and a pressure chamber $R_6$. The annular pressure chamber $R_5$ is in communication with the first inlet port 21a through a communication passage 24, whereas the pressure chamber $R_6$ is in communication with the second inlet port 21b through a communication passage 25.

The cut-off valve unit 50 is mounted on an instrument panel (not shown) of the vehicle and comprises a manual knob 52, a push rod 52 and a check valve 54 assembled within a housing 51. Under unloaded condition of the vehicle, the manual knob 52 is pulled in a first position shown by imaginary lines in FIG. 1 so that the check valve 54 closes to block fluid communication between the ports 51a and 51b therethrough. Under loaded condition of the vehicle, the manual knob 52 is pushed into a second position shown by solid lines in FIG. 1 so that the check valve 54 is opened by rightward movement of the push rod 53 to permit fluid communication between the ports 51a and 51b therethrough. The manual knob 52 is provided therein with a pilot lamp (not shown) which is electrically connected to a conventional stroke switch. When the manual knob 52 is pushed into the second position, the pilot lamp is lighted due to activation of the stroke switch to indicate opened condition of the check valve 54 to the operator.

In operation, under unloaded condition of the vehicle, the manual knob 52 of the cut-off valve unit 50 is pulled in the first position to close the check valve 54 so as to block fluid communication between the master cylinder 10 and the second inlet port 21b of the servomechanism 20. When the servomechanism 20 is inoperative, the lower piston 31 is in the leftward stroke end and the check valve 35 in the operating piston 32 is opened by the float member 36. This permits the fluid communication between the pressure chambers $R_3$ and $R_4$ to release fluid pressure in the wheel brake cylinders 12. In the second stepped bore 26, the first and second control pistons 46 and 47 are in the leftward stroke end shown in FIG. 1 by biasing force of the compression spring 43 to separate the valve seat 41a of the diaphragm 41 from the first valve part 42a of the valve body 42. Thus, the control chamber $R_1$ is communicated with the atmospheric air through the holes of the valve seat 41a and the air outlet port 21e. The second valve part 42b of the valve body 42 is engaged with the valve seat 45 by biasing force of the compression spring 44 to block compressed air supplied into the control chamber $R_1$ from the air tank 13.

When the master cylinder pressure is produced in the master cylinder 10 by depression of the brake pedal 11, the master cylinder pressure is applied into the wheel brake cylinders 12 through the pipe-line $P_1$, the first inlet port 21a, the pressure chamber $R_3$, the opened check valve 35, the pressure chamber $R_4$, the outlet port 21c and the pipe-line $P_3$ in sequence. At the same time, the master cylinder pressure is applied into the annular pressure chamber $R_5$ through the first inlet port 21a and the communication passage 24. This moves slightly the first control piston 46 against biasing force of the compression spring 43 to engage the valve seat 41a with the first valve part 42a of the valve body 42. Subsequently, the second valve part 42b of the valve body 42 is slightly separated from the valve seat 45 against biasing force of the compression spring 44 due to rightward movement of the diaphragm 41 to apply compressed air from the air tank 13 into the control chamber $R_1$ through the pipe-line $P_4$. In this instance, the compressed air is controlled by the control valve 40 to be applied into the control chamber $R_1$ as lower compressed air than that in the air tank 13. Then, the controlled compressed air is applied into the lower chamber $R_2$ through the passage 27 to move the power piston 31 rightward against biasing fore of the compression spring 33 so that the operating piston 32 is moved rightward to close the check valve 35 by means of retraction of the flat member 36. After closure of the check valve 35, the fluid pressure trapped in the pressure chamber $R_4$ is increased by further rightward movement of the piston 32 to actuate the wheel brake cylinders 12 so as to ensure braking operation of the vehicle.

Under loaded condition of the vehicle, the manual knob 52 of the cut-off valve unit 50 is pushed into the second position to open the check valve 54 due to rightward movement of the push rod 53 so as to connect the pipe-line $P_1$ to the pipe-line $P_2$ through the ports 51a and 51b. When the master cylinder pressure is produced in the master cylinder 10 by depression of the brake pedal 11, the master cylinder pressure is applied into the annular pressure chamber $R_5$ through the communication passage 24 and into the wheel brake cylinders 12 through the opened check valve 35 in the operating piston 32. At the same time, the master cylinder pressure is additionally applied into the pressure chamber $R_6$ through the opened check valve 54 of the cut-off valve unit 50, the second inlet port 21b and the communication passage 25 in sequence. Then, the second control piston 47 is moved rightward against biasing force of the compression spring 43 due to the master cylinder pressure in the pressure chamber $R_6$ to move the first control piston 47 rightward. Subsequently, the valve body 42 is moved rightward against biasing force of the spring 44 due to engagement of the valve seat 41a with the first valve part 42a. This separates the second valve part 42b from the valve seat 45 in a great extent to apply compressed air from the air tank 13 into the control chamber $R_1$. In this instance, the compressed air is controlled by the control valve 40 to be applied into the control chamber $R_1$ as higher compressed air that that under unloaded condition of the vehicle. Other operation is substantially the same as that under unloaded condition of the vehicle.

From the above descripton, it should be recognized that under unloaded condition of the vehicle, the compressed air applied into the control chamber $R_1$ is controlled by the control valve 40 in relation to the master cylinder pressure acting on the first control piston 46 and under loaded condition of the vehicle, the compressed air is controlled by the control valve 40 in relation to the master cylinder pressure acting on the second control piston 47. This means that the braking force under unloaded condition of the vehicle is smaller than that under loaded condition of the vehicle in accordance with the pressure receiving ratio $(A_1 31 A_2)/A_1$ of the first and second pistons 46 and 47.

In FIG. 3, there is illustrated a modification of the cut-off valve unit 50 wherein an electrically operated cut-off valve unit 150 is provided to open and close the fluid communication between the pipe-line $P_1$ and the pipe-line $P_2$ shown in FIG. 1. The portion of the cut-off valve unit 150 is electrically controlled by operation of a normally open switch 60 interposed between a vehicle body 61 and a suspension mechanism 62. When the switch 60 is close under loaded condition of the vehicle, the cut-off valve unit 150 is energized to move a push rod 153 rightward so as to open a check valve 154. This permits the fluid communication between the pipe-line $P_1$ and the pipe-line $P_2$. In the case the switch 60 is closed under unloaded condition of the vehicle, the cut-off valve unit 150 is deenergized to close the check valve 154.

Although in the above embodiment the present invention is embodied to the servomechanism 20, it may be also embodied to other brake boosters with a control piston operated by the master cylinder pressure.

Although certain specific embodiments of the invention have been shown and described it is obvious that many modifications thereof are possible. The invention, therefore, is not intended to be restricted to the exact showing of the drawings and description thereof, but is considered to include reasonable and obvious equivalents.

What is claimed is:

1. A brake booster for vehicle having a hydraulic circuit connecting a master cylinder to wheel brake cylinders, comprising:

a housing provided therein with a first bore for interposition within said hydraulic circuit between said master cylinder and said wheel brake cylinders, a second bore arranged coaxially with said first bore, and a third bore in communication with said second bore;

an operating piston reciprocable within said first bore and provided therein with a check valve means for permitting the flow of fluid supplied from said master cylinder to said wheel brake cylinders when said operating piston is in a retracted position and blocking the flow of fluid from said wheel brake cylinders to said master cylinder when said operating piston is moved forward from the retracted position;

a power piston reciprocable within said second bore of said housing and having a push rod extending into said first bore for moving said operating piston forward from the retracted position to increase the hydraulic pressure trapped within said first bore after closing of said check valve means, valve means disposed within said third bore of said housing for controlling pneumatic pressure applied into said second bore from a pneumatic pressure source to actuate said power piston;

a first control piston movable within said third bore of said housing to form a first chamber in communication with said master cylinder and operatively connected with said valve means for actuating said valve means in response to master cylinder pressure applied into said first chamber from said master cylinder;

a second control piston movable within said third bore of said housing to form a second chamber in communication with said master cylinder and cooperable with said first control piston for actuating said valve means in response to the master cylinder pressure applied into said second chamber, the pressure receiving area of said first control piston being smaller than that of said second control piston; and cut-off valve means interposed between said master cylinder and said second chamber for closing the fluid communication between said master cylinder and said second chamber when the vehicle is unloaded and opening the fluid communication between said master cylinder and said second chamber when the vehicle is loaded.

2. A brake booster as claimed in claim 1, wherein said first control piston is a stepped piston provided therein with a bore and said second control piston is a stepped piston having large diameter portion reciprocable within said third bore and a small diameter portion reciprocable within said bore of said first stepped piston.

3. A brake booster as claimed in claim 1, wherein said cut-off valve means comprises a normally closed valve for blocking the flow of fluid from said master cylinder to said second chamber formed by said second control piston, and means for manually opening said normally closed valve when the vehicle is loaded.

4. A brake booster as claimed in claim 1, wherein a normally open switch is assembled wth a suspension mechanism of the vehicle to be closed when the vehicle is loaded and said cut-off valve means comprises an electrically operated valve for normally blocking the flow of fluid from said master cylinder to said second chamber formed by said second control piston, and means for elecrtically operating said valve when said switch is closed so as to permit the flow of fluid from said master cylinder to said second chamber.

* * * * *

UNITED STATES PATENT AND TRADEMARK OFFICE
CERTIFICATE OF CORRECTION

PATENT NO. : 4,140,351
DATED : February 20, 1979
INVENTOR(S) : Nogami

It is certified that error appears in the above–identified patent and that said Letters Patent are hereby corrected as shown below:

Please correct the above-identified patent to reflect the following priority information:

--[30] Foreign Application Priority Data

June 8, 1977 Japan...............52- 67442--

Signed and Sealed this

Twenty-fifth Day of September 1979

[SEAL]

Attest:

Attesting Officer

LUTRELLE F. PARKER
*Acting Commissioner of Patents and Trademarks*